United States Patent
Park et al.

(10) Patent No.: US 6,930,743 B2
(45) Date of Patent: Aug. 16, 2005

(54) ARRAY SUBSTRATE FOR A LIQUID CRYSTAL DISPLAY DEVICE WITH PARTICULAR TERMINAL LINK LINES AND FABRICATING METHOD THEREOF

(75) Inventors: Hyun-Tak Park, Gyeongsangbuk-do (KR); Choong-Un Lee, Daegugwangyeok-si (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/329,490

(22) Filed: Dec. 27, 2002

(65) Prior Publication Data

US 2003/0122989 A1 Jul. 3, 2003

(30) Foreign Application Priority Data

Dec. 28, 2001 (KR) .................................. 2001-0087518

(51) Int. Cl.⁷ ............................................ G02F 1/1345
(52) U.S. Cl. ........................................................ 349/149
(58) Field of Search ......................................... 349/149

(56) References Cited

U.S. PATENT DOCUMENTS 5,995,189 A * 11/1999 Zhang .......................... 349/153

FOREIGN PATENT DOCUMENTS

KR    1997-0048811        7/1997

* cited by examiner

*Primary Examiner*—Frank G. Font
*Assistant Examiner*—Timothy L. Rude
(74) *Attorney, Agent, or Firm*—Birch, Stewart, Kolasch & Birch, LLP

(57) ABSTRACT

An array substrate for a liquid crystal display device includes a substrate, a gate line and a gate link line on the substrate. The gate link line is extended from the gate line. A data line and a data link line cross over the gate line and the gate link line. The crossing of the data line and the gate line defines a pixel region. The data link line is extended from the data line. A thin film transistor is connected to the gate line and the data line. A dummy pattern is disposed between adjacent data link lines, and a pixel electrode is disposed at the pixel region.

16 Claims, 13 Drawing Sheets

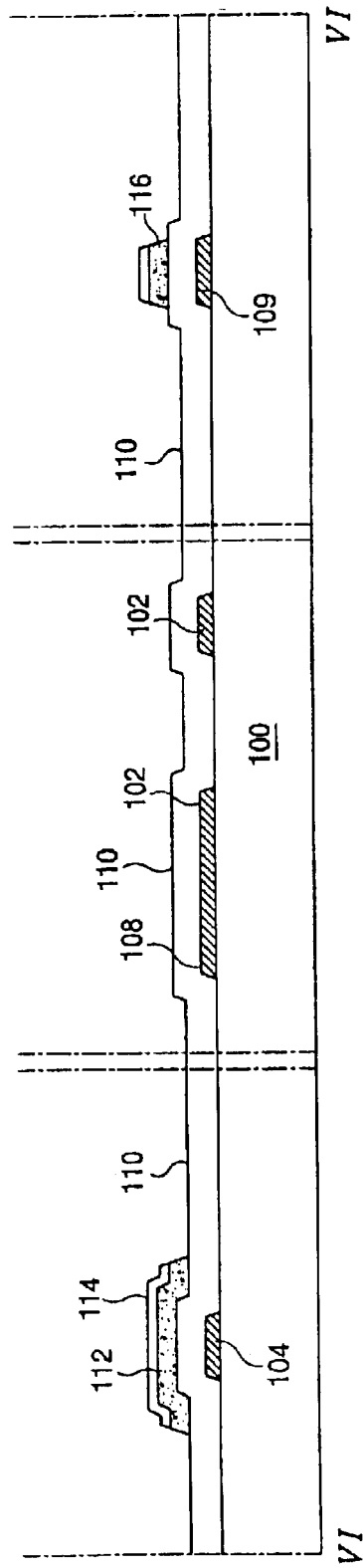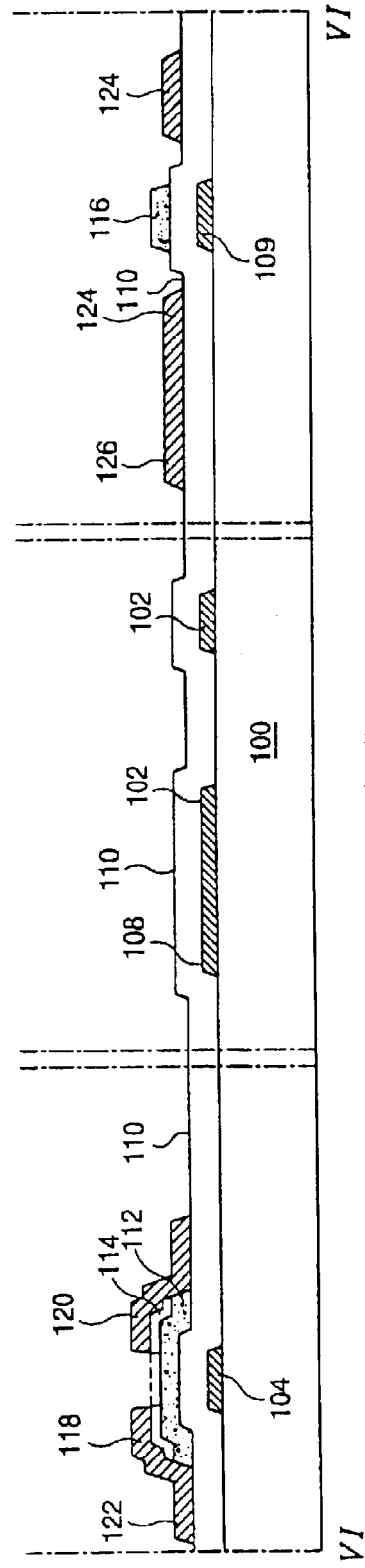

US 6,930,743 B2

ARRAY SUBSTRATE FOR A LIQUID CRYSTAL DISPLAY DEVICE WITH PARTICULAR TERMINAL LINK LINES AND FABRICATING METHOD THEREOF

BACKGROUND OF THE INVENTION

This application claims the benefit of Korean Patent Application No. 2001-87518, filed on Dec. 28, 2001, which is hereby incorporated by reference for all purposes as if fully set forth herein.

1. Field of the Invention

The present invention relates to liquid crystal display (LCD) devices. More particularly, the present invention relates to an array substrate for LCD devices having a structure where a breakage of a line is minimized and a signal can flow even when the line is broken. The present invention also relates to a fabricating method for producing such an array substrate.

2. Discussion of the Related Art

Generally, a conventional liquid crystal display (LCD) device uses optical anisotropy and polarization properties of liquid crystal molecules. The liquid crystal molecules have a definite orientational order in alignment resulting from their thin and long shapes. The alignment direction of the LC molecules can be controlled by applying an electric field to the liquid crystal molecules. In other words, as the alignment direction of the electric field is changed, the alignment of the liquid crystal molecules also changes. Since the incident light is refracted based on an orientation of the liquid crystal molecules, due to the optical anisotropy of the aligned liquid crystal molecules, an intensity of the incident light can be controlled.

The LCD devices include upper and lower substrates, where color filters and thin film transistors (TFTs) are respectively disposed. The upper and lower substrates are referred to as a color filter substrate and an array substrate, respectively. A liquid crystal layer is interposed between the upper and lower substrates. The liquid crystal layer is driven by an electric field between a common electrode and a pixel electrode. The LCD devices have a high transmittance and a high aperture ratio.

Recent research has been devoted to, active matrix LCD devices, where TFTs and pixel electrodes, connected to the TFTs, are disposed in a shape of matrix. FIG. 1 is a schematic perspective view of an active matrix liquid crystal display (AM-LCD) device, in accordance with the related art.

In FIG. 1, the AM-LCD device 11 includes upper and lower substrates 5 and 22, and a liquid crystal layer 14 interposed therebetween. The upper substrate 5 includes a black matrix 6, a color filter layer 8 and a common electrode 18. The lower substrate 22 includes a pixel electrode 17 at a pixel region "P" and an array line having a TFT "T." Each TFT "T" functions as a switching device, is disposed in a matrix, and is connected to a gate line 13 and a data line 15. The pixel region "P" is defined by a cross of the gate line 13 and the data line 15. The pixel electrode 17 at the pixel region "P" is made of a transparent conductive material such as indium-tin-oxide (ITO) of high transmittance. A gate pad 24 and a data pad 26 having a specific area are formed at one end of the gate line 13 and the data line 15, respectively. An external signal is applied to each pad 24 and 26, and transmitted to the TFT "T" through each line.

FIG. 2 is a flow chart illustrating a conventional fabricating process of a liquid crystal cell. In step st1, a lower substrate is prepared by forming an array of TFTs and pixel electrodes corresponding to the TFTs on the lower substrate.

In step st2, an orientation film is formed on the lower substrate. Formation of the orientation film includes depositing a polymeric thin film on the lower substrate and subsequently performing a rubbing process. The polymeric thin film is deposited on the lower substrate with a uniform thickness. The rubbing process is also uniform. The rubbing process determines an initial alignment direction and enables normal operation of the liquid crystal layer and the uniform display characteristic of the LCD device. Typically, an organic material of the polyimide series is used as the orientation film. The rubbing process includes rubbing the orientation film in a specific direction with a rubbing cloth, thereby aligning the liquid crystal molecules along, or in, the rubbing direction.

In step st3, a seal pattern is formed on the lower substrate. For each liquid crystal cell, the seal pattern serves two functions: forming a gap for liquid crystal material injection and confining the injected liquid crystal material. The seal patterning process forms a desired pattern by the application of a thermosetting plastic. A screen-printing method, using a screen mask, is typically used for this process.

In step st4, a spacer is sprayed on the lower substrate. The size of the spacer used in the liquid crystal cell maintains a precise and uniform gap between the upper and lower substrates. Accordingly, the spacers are uniformly sprayed on the lower substrate. The spacer spray method can be divided into two different types: a wet spray method that involves spraying a mixture of alcohol and spacer material, and a dry spray method that involves spraying spacer material alone.

In step st5, the upper and lower substrates are aligned and attached.

In step st6, the attached liquid crystal substrates are divided into unit cells. Generally, a plurality of unit cells are formed on a large sized glass substrate, and then divided through a cutting process. In the fabrication process of the initial LCD devices, the unit cells are separated after simultaneous injection of the liquid crystal material into the unit cells. However, injection of liquid crystal material is commonly performed after a large sized liquid crystal substrate is cut into unit cells due to an increase in the cell size.

In step st7, a liquid crystal material is injected into the unit cells. The unit cell has a size of several hundred square centimeters with a gap of several micrometers. Accordingly, a vacuum injection method using a pressure difference between the interior and exterior of the unit cell is commonly used as an effective injection method.

In step st8, a portion of the upper substrate is cut to expose a driving portion on the lower substrate. This step is referred to as a scribe/break process. In the scribe/break process, a breakage of a line on the lower substrate often occurs.

FIG. 3 is a schematic plan view of the AM-LCD device of FIG. 1. As previously discussed, the AM-LCD device 11 includes the upper and lower substrates 5 and 22. Each gate line 13 has an associated gate pad 24 at one end, and is formed along a first direction on the lower substrate 22. Each data line 15 has an associated data pad 26 at one end, and crosses the gate lines 13, thereby defining a matrix of pixel regions "P". Also, the transparent pixel electrodes 17 are formed at the pixel regions "P." Each TFT "T" includes a gate electrode 30, an active layer 32, and source and drain electrodes 36 and 38. Each TFT "T" is connected to one of the gate lines 13 and one of the data lines 15.

Since an external signal is directly applied to each pad 24 and 26 of a driving region "D," each pad 24 and 26 is exposed. An additional gate pad terminal 60 and an additional data pad terminal 62 are formed to minimize an influence resulting from an external environment and prevent a bad contact between an external signal line and each pad 24 and 26. The gate pad 24 is connected to the gate line 13 through a gate link line 42 and the data pad 26 is connected to the data line 15 through a data link line 46. The hatched region shows a portion of the upper substrate 5 where the black 6 matrix is formed. The upper substrate 5 is cut to expose the driving region "D" of the lower substrate 22 through the scribe/break process illustrated in step st8.

FIGS. 4A to 4C are schematic cross-sectional views showing a fabricating process of an array substrate for the related art AM-LCD device 11. FIGS. 4A to 4C are taken along the line IV—IV of FIG. 3.

In FIG. 4A, the gate line 13 (of FIG. 3), the gate link line 42 and the gate pad 24 are formed on the lower substrate 22 through depositing and patterning one of a conductive metal group, including aluminum (Al) and aluminum alloy of low resistance. The gate line 13 (of FIG. 3) is disposed along a first direction and the gate link line 42 is extended from the gate line 13 (of FIG. 3). The gate pad 24 is formed at one end of the gate link line 42. Here, the gate line 13 (of FIG. 3) including the gate electrode 30, the gate link line 42 and the gate pad 24 are about 2700 in height. Next, a gate insulating layer 31, a first insulating layer, is formed on an entire surface of the lower substrate 22 through depositing one of an inorganic insulating material group including silicon nitride (SiNx) and silicon oxide (SiO$_2$). The gate insulating layer 31 is about 4000 in height.

In FIG. 4B, an active layer 32 and an ohmic contact layer 34 of an island shape are sequentially formed on the gate insulating layer 31 over the gate electrode 30. Generally, the active layer 32 is made of amorphous silicon including hydrogen (a-Si:H) and the ohmic contact layer 34 is made of impurity-doped amorphous silicon including n-type or p-type impurities. Next, the source and drain electrodes 36 and 38 are formed on the ohmic contact layer 34 through depositing and patterning one of a conductive metal group including chromium (Cr), tungsten (W), molybdenum (Mo) and titanium (Ti). The data line 15, connected to the source electrode 36, is formed at the same time. The data link line 46 is connected to the data line 15, and the data pad 26 is formed at one end of the data link line 46. Here, the data line 46 including the data pad 26 and the data link line 46 are about 1500 in height. The source and drain electrodes 36 and 38 are spaced apart from each other. The ohmic contact layer 34 between the source and drain electrodes 36 and 38 is etched so that the active layer 32 is exposed. The exposed active layer 32 functions as a channel where carriers of the source and drain electrodes 36 and 38 are transmitted. Next, a passivation layer 50 is formed on an entire surface of the lower substrate 22 through depositing one of a transparent organic insulating material group including benzocyclobutene (BCB), acrylic resin. The passivation layer 50 is about 2000 in height. The passivation layer 50 has a drain contact hole 52 exposing the drain electrode 38, a gate pad contact hole 54 exposing the gate pad 24, and a data pad contact hole 56 exposing the data pad 26.

In FIG. 4C, the pixel electrode 17, contacting the drain electrode 38, is formed at the pixel region "P" through depositing and patterning one of a transparent conductive metal group including indium-tin-oxide (ITO) and indium-zinc-oxide (IZO). Simultaneously, the gate pad terminal 60 and the data pad terminal 62 of an island shape are formed. The gate pad terminal 60 and the data pad terminal 62 contact the gate pad 24 and the data pad 26, respectively.

In the related art AM-LCD device 11, a cutting line for the upper substrate 5 crosses the gate link line 42 and the data link line 46. Since the gate insulating layer 31 and the passivation 50 layer over the gate link line 42 have a total height are totally of about 6000, the gate link line 42 is not very influenced by a pressure exerted by a cutting device. On the other hand, since the passivation layer 50 over the data link line 46 is only about 2000 in height, the data link line 46 may be scratched or damaged along a portion under the cutting line. Further, the data link line 46 may be broken.

SUMMARY OF THE INVENTION

Accordingly, the present invention is directed to an array substrate for a liquid crystal display device that substantially obviates one or more of problems due to limitations and disadvantages of the related art.

An advantage of the present invention is to provide an array substrate for a liquid crystal display device including first and second dummy patterns between the adjacent data link lines.

Additional features and advantages of the present invention will be set forth in the description which follows, and in part will be apparent from the description, or may be learned by the practice of the present invention. The objectives and other advantages of the present invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes: a substrate; a gate line and a gate link line on the substrate, the gate link line being extended from the gate line; a data line and a data link line over the gate line and the gate link line, the data line crossing the gate line to define a pixel region, the data link line being extended from the data line; a thin film transistor connected to the gate line and the data line; a dummy pattern between the adjacent data link lines; and a pixel electrode at the pixel region.

A fabricating method of an array substrate for a liquid crystal display device includes: forming a gate electrode, a gate line, a gate link line and a first dummy pattern on a substrate, the gate electrode being connected to the gate line, the gate link line being extended from the gate line, the first dummy pattern being disposed between the adjacent gate link lines; forming a first insulating layer on the gate electrode, the gate line, the gate link line and the first dummy pattern; forming an active layer, an ohmic contact layer and a second dummy pattern on the first insulating layer, the active layer and the ohmic contact layer being disposed over the gate electrode, the second dummy pattern being disposed over the first dummy pattern; forming a data line, a data link line, and source and drain electrodes on the first insulating layer, the data line crossing the gate line to define a pixel region, the data link line being extended from the data line, the source and drain electrodes contacting the ohmic contact layer; forming a second insulating layer on the data line, the data link line, and the source and drain electrodes; and forming a pixel electrode at the pixel region, the pixel electrode contacting the drain electrode.

In another aspect, an array substrate for a liquid crystal display device includes: a substrate; a gate line, a gate link line and a gate pad on the substrate, the gate link line being extended from the gate line, the gate pad being disposed at one end of the gate link line; a data line, a data link line and a data pad over the gate line, the gate link line and the gate pad, the data line crossing the gate line to define a pixel region, the data link line being extended from the data line, the data pad being disposed at one end of the data link line; a thin film transistor connected to the gate line and the data line; a data dummy line between the adjacent data link lines; a gate dummy line between the adjacent gate link lines; a data pad terminal contacting the data pad and one end of the data dummy line; a data contact pattern contacting the other end of the data link line and the other end of the data dummy line; a gate pad terminal contacting the gate pad and one end of the gate dummy line; a gate contact pattern contacting the other end of the gate link line and the other end of the gate dummy line; and a pixel electrode at the pixel region.

In another aspect, A fabricating method of an array substrate for a liquid crystal display device includes: forming a gate electrode, a gate line, a gate link line, a gate pad and a data dummy line on a substrate, the gate electrode being connected to the gate line, the gate link line being extended from the gate line, the gate pad being disposed at one end of the gate link line, the data dummy line being disposed between the adjacent data link lines; forming a first insulating layer on the gate electrode, the gate line, the gate link line, the gate pad and the data dummy line; forming an active layer and an ohmic contact layer on the first insulating layer over the gate electrode; forming a data line, a data link line, a data pad and a gate dummy line on the first insulating layer, the data line crossing the gate line to define a pixel region, the data link line being extended from the data line, the data pad being disposed at one end of the data link line, the gate dummy line being disposed between the adjacent gate link lines; forming a second insulating layer on the data line, the data link line, the data pad and the gate dummy line; and forming a data pad terminal, a data contact pattern, a gate pad terminal, a gate contact pattern and a pixel electrode on the second insulating layer, the data pad terminal contacting the data pad and one end of the data dummy line, the data contact pattern contacting the other end of the data link line and the other end of the data dummy line, the gate pad terminal contacting the gate pad and one end of the gate dummy line, the gate contact pattern contacting the other end of the gate link line and the other end of the gate dummy line, the pixel electrode contacting the drain electrode.

It is to be understood that both the foregoing general description and the following detailed description are exemplary and explanatory and tended to provide further explanation of the present invention as claimed.

BRIEF DESCRIPTION OF THE DRAWINGS

The accompanying drawings, which are included to provide a further understanding of the present invention and are incorporated in and constitute a part of this specification, illustrate embodiments of the invention and together with the description serve to explain the principles of the present invention, and wherein:

FIGS. 6A to 6D are schematic cross-sectional views showing a fabricating process of an array substrate for the liquid crystal display device of FIG. 5, taken along line VI—VI of FIG. 5;

DETAILED DESCRIPTION OF THE INVENTION

Reference will now be made in detail to the illustrated embodiments of the present invention, as shown in the accompanying drawings.

Figure 1:
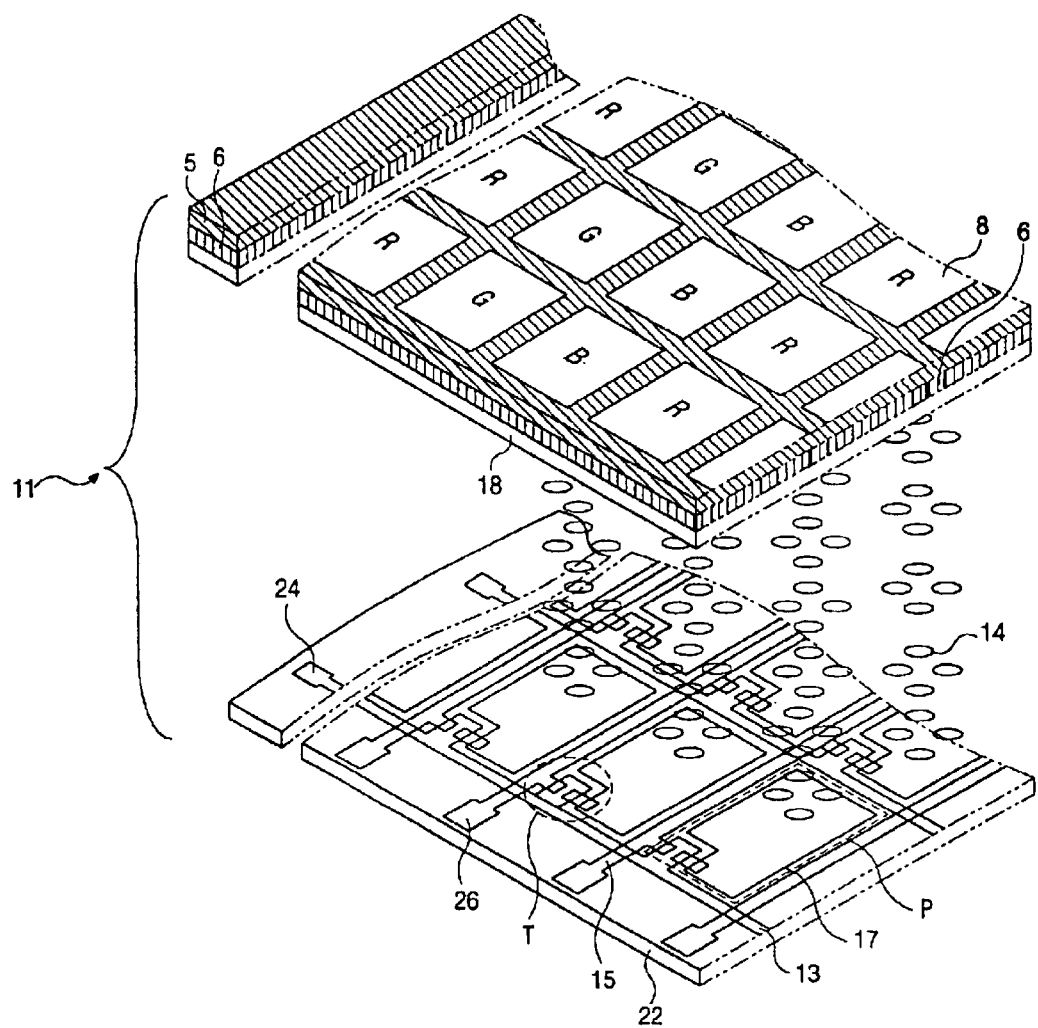
FIG. 1 is a schematic perspective view of an active matrix liquid crystal display (AM-LCD) device, in accordance with the related art.
Figure 2:
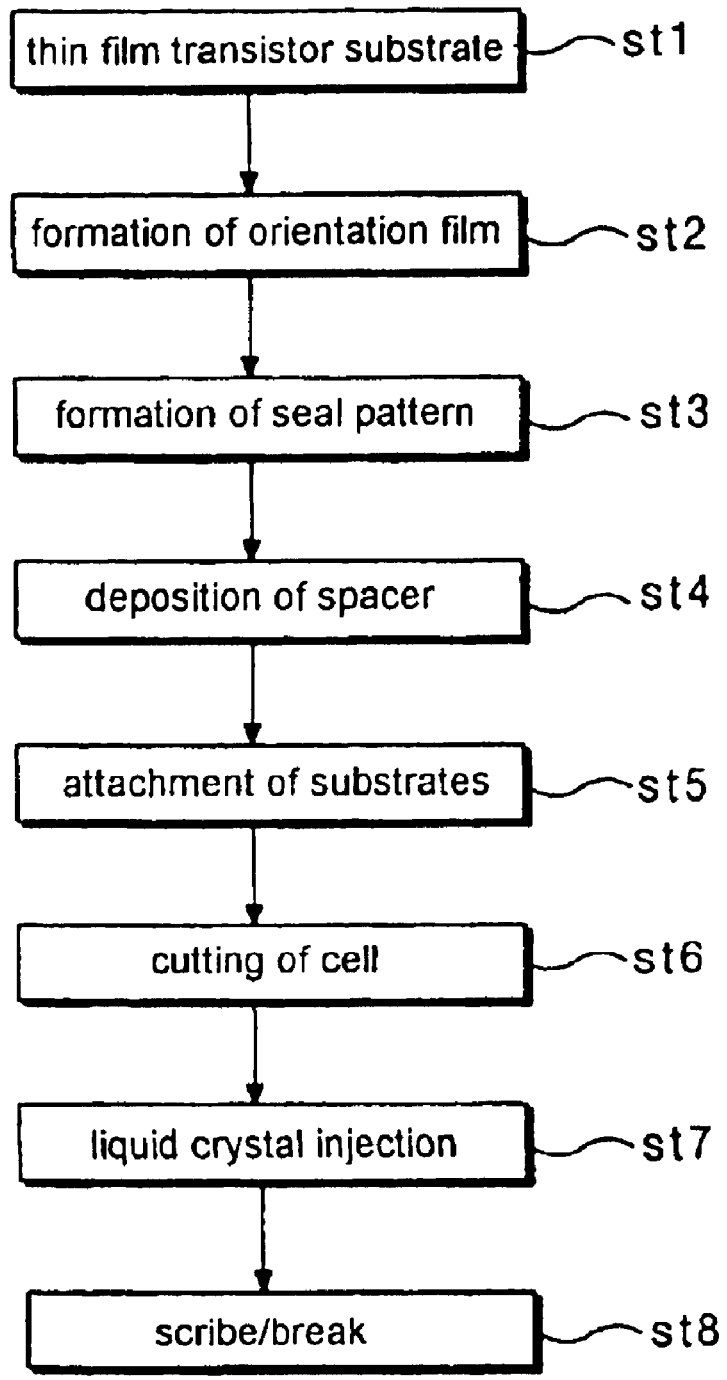
FIG. 2 is a flow chart illustrating a fabricating process of a liquid crystal cell, in accordance with the related art.
Figure 3:
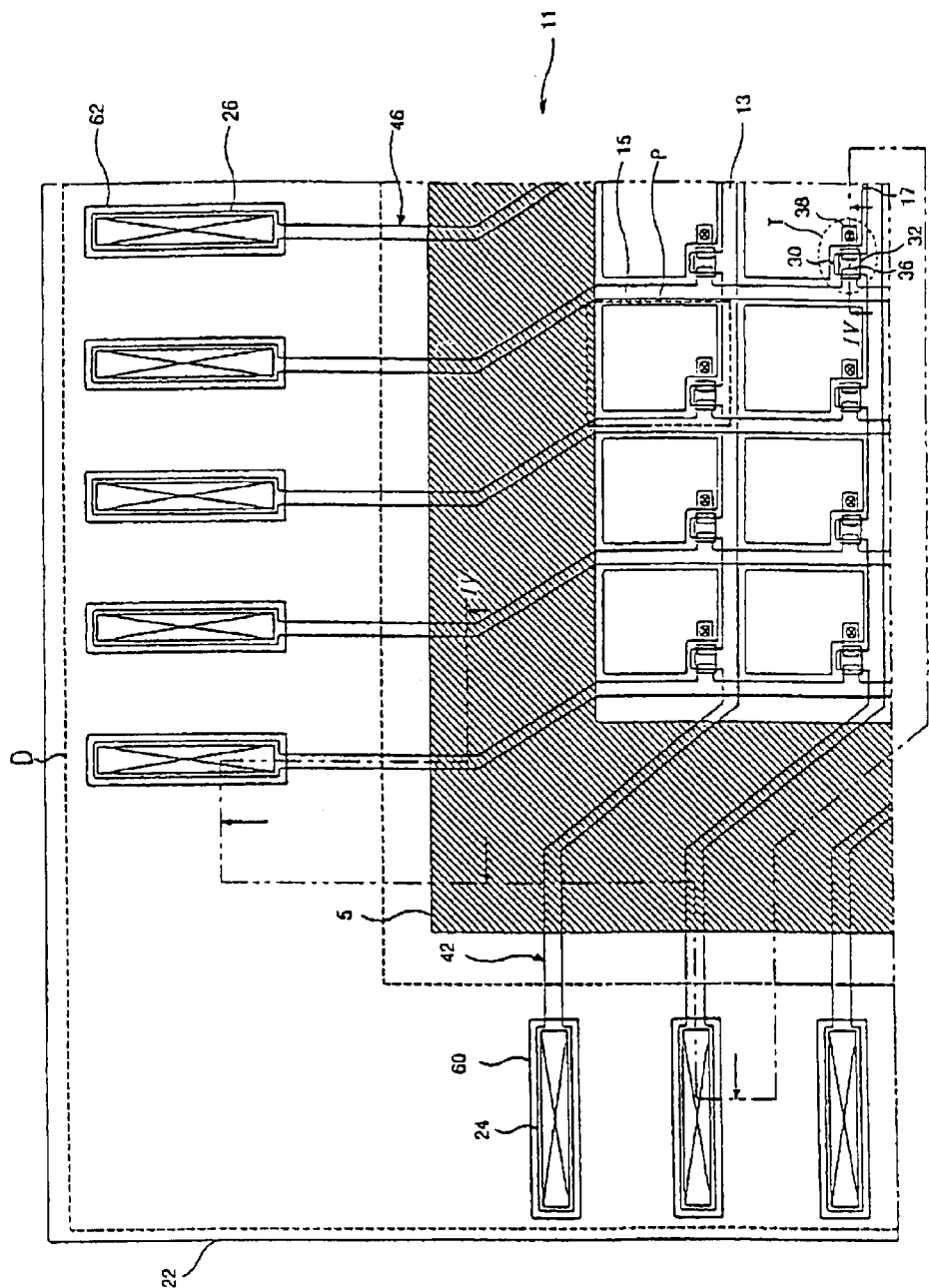
FIG. 3 is a schematic plan view of the AM-LCD device of FIG. 1.
Figure 4A:
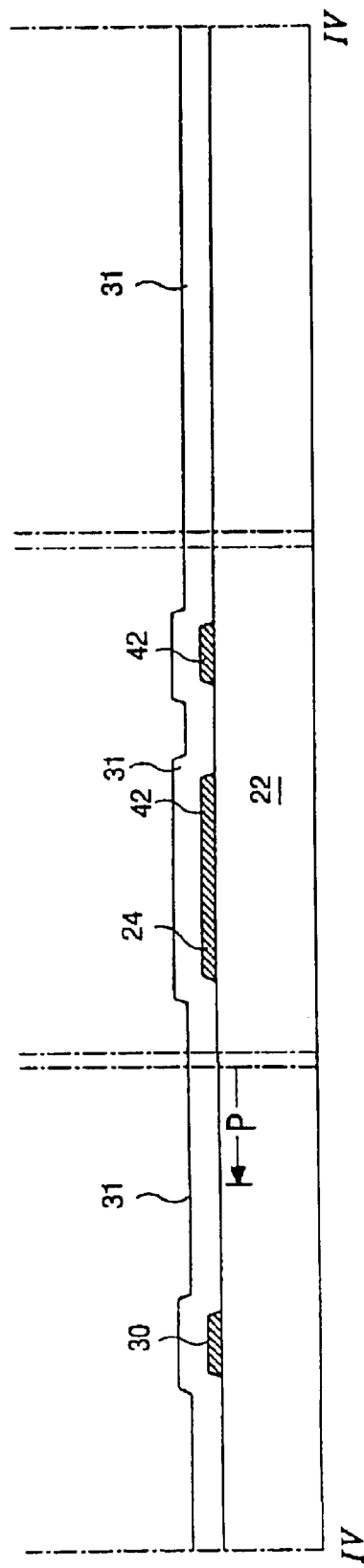
FIGS. 4A to 4C are schematic cross-sectional views showing a fabricating process of an array substrate for the AM-LCD device of FIG. 3, taken along a line IV—IV of FIG. 3.
Figure 4B:
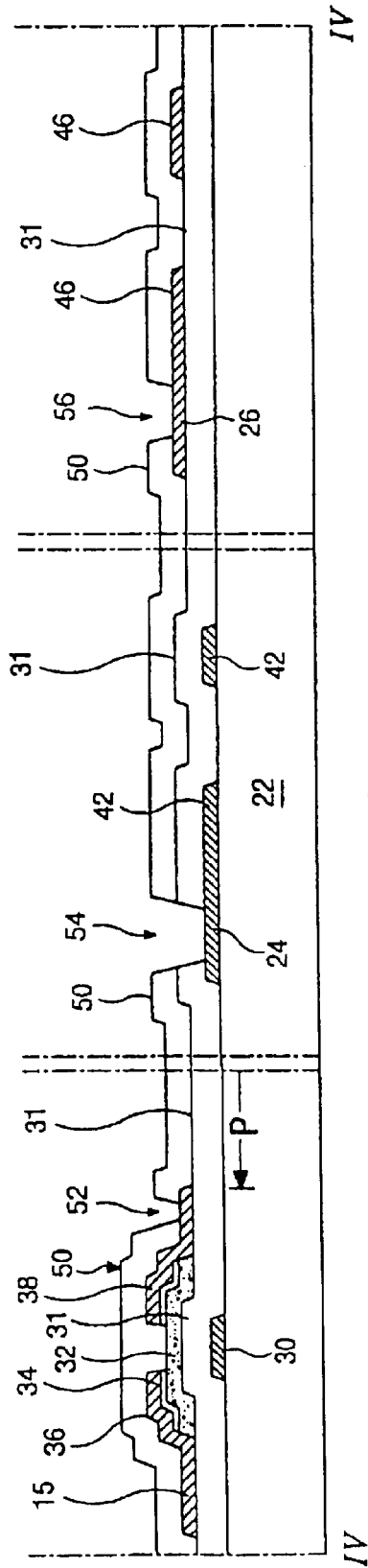
Figure 4C:
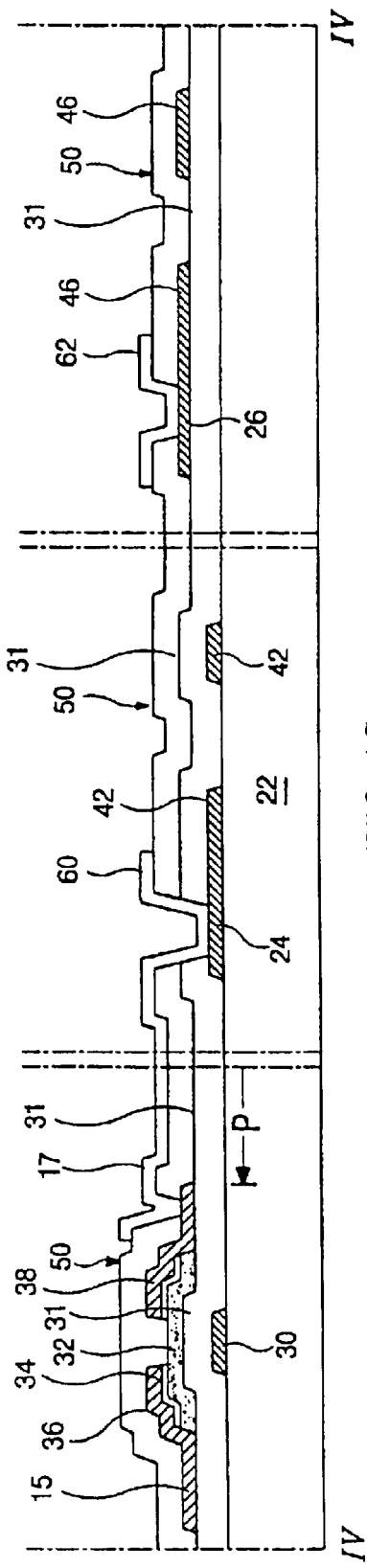
Figure 5:
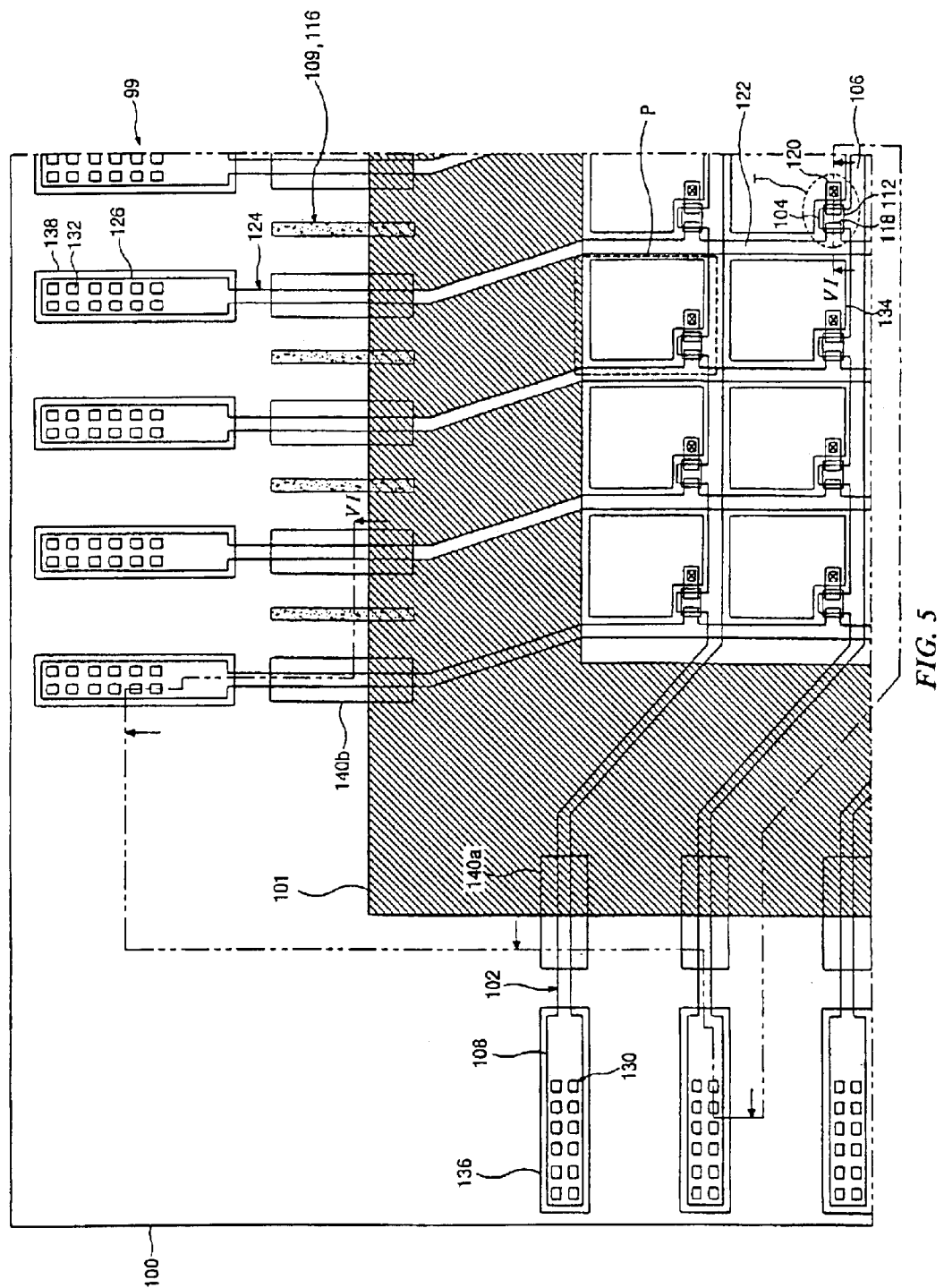
FIG. 5 is a schematic plan view of a liquid crystal display device, according to a first embodiment of the present invention.

FIG. 5 is a plane view of a liquid crystal display device according to a first embodiment of the present invention. In FIG. 5, an LCD device 99 includes first and second substrates 100 and 101, spaced apart from each other. The first substrate 100 includes a gate line 106 and a data line 122. The data line 122 crosses the gate line 106 to define a pixel region "P." A transparent pixel electrode 134 is formed at the pixel region "P."

A gate link line 102 is extended from the gate line 106, and a gate pad 108 is disposed at one end of the gate link line 102. The gate pad 108 is wider than the gate link line 102. Similarly, a data link line 124 is extended from the data line 122 and a data pad 126, which is wider than the data link line 124, is disposed at one end of the data link line 124.

A TFT "T" includes a gate electrode 104, an active layer 112, and source and drain electrodes 118 and 120. Each TFT "T" is connected to one of the gate lines 106 and one of the data lines 122.

A dummy pattern or line 109 and 116 is formed between the adjacent data link lines 124. The dummy pattern 109 and 116 includes a first dummy pattern 109 (of FIG. 6A) having the same material as the gate electrode 104, and a second dummy pattern 116 (of FIG. 6A) having the same material as the active layer 112. As a result, a portion having the dummy pattern 109 and 116 is higher than a portion having the data link line 124.

A protection pattern 140a and 140b of a transparent conductive material is formed over the gate link line 102 and the data link line 124. The dummy pattern 109 and 116 absorbs a pressure to the data link line 124 during a cutting process of the second substrate 101. Therefore, a likelihood of damaging the data link line 124 is reduced. The dummy pattern 109 and 116 may also be disposed between the adjacent gate link lines 102.

FIGS. 6A to 6D are schematic cross-sectional views showing a fabricating process of an array substrate for the liquid crystal display device according to the first embodiment of the present invention. FIGS. 6A to 6D are taken along the line VI—VI of FIG. 5.

In FIG. 6A, a gate electrode 104, a gate line 106 (of FIG. 5), a gate link line 102, a gate pad 108 and a first dummy pattern 109 are formed on the first substrate 100. The gate electrode 104 is connected to the gate line 106 (of FIG. 5) and the gate link line 102 is extended from the gate line 106 (of FIG. 5). The gate pad 108 is disposed at one end of the gate link line 102, and the first dummy pattern 109 is disposed at a data driving portion (not shown). Here, the gate electrode 104, the gate line 106 (of FIG. 5), the gate link line 102, the gate pad 108 and the first dummy pattern 109 are about 2700 in height.

Next, a first insulating layer 110, a gate insulating layer, is formed on an entire surface of the substrate 100 through depositing one of an inorganic insulating material group including silicon nitride (SiNx) and silicon oxide ($SiO_2$). The first insulating layer 110 is about 4000 in height.

Next, an active layer 112 and an ohmic contact layer 114 of an island shape are sequentially formed on the first insulating layer 110. Generally, the active layer 112 is made of amorphous silicon including hydrogen (a-Si:H) and the ohmic contact layer 114 is made of impurity-doped amorphous silicon (p$^+$a-Si:H or n$^+$a-Si:H). Simultaneously, a second dummy pattern 116 of a-Si:H is formed on the first insulating layer 110 over the first dummy pattern 109. The active layer 112 is about 2000 in height.

In FIG. 6B, a data line 122, and source and drain electrodes 118 and 120 are formed on the first insulating layer 110 through depositing and patterning one of a conductive metal group including chromium (Cr), tungsten (W), molybdenum (Mo) and titanium (Ti). The source and drain electrodes 118 and 120 contact the ohmic contact layer 114. The data line 122 is connected to the source electrode 118. The data link line 124 is extended from the data line 122 and a data pad 126 is disposed at one end of the data link line 124.

The first and second dummy patterns 109 and 116 are disposed between the adjacent data link lines 124. That is, the data link line 124 alternates with the dummy pattern 109 and 116 in plan view. The data line 122 or the data link line 124 is about 1500 in height.

The source and drain electrodes 118 and 120 are spaced apart from each other, and the active layer 112 between the source and drain electrodes 118 and 120 is exposed through etching the ohmic contact layer between the source and drain electrodes 118 and 120. At this time, the ohmic contact layer on the second dummy pattern 116 is also etched. The active layer 112 between the source and drain electrodes 118 and 120 functions as a channel where carriers are transmitted.

Figure 6C:
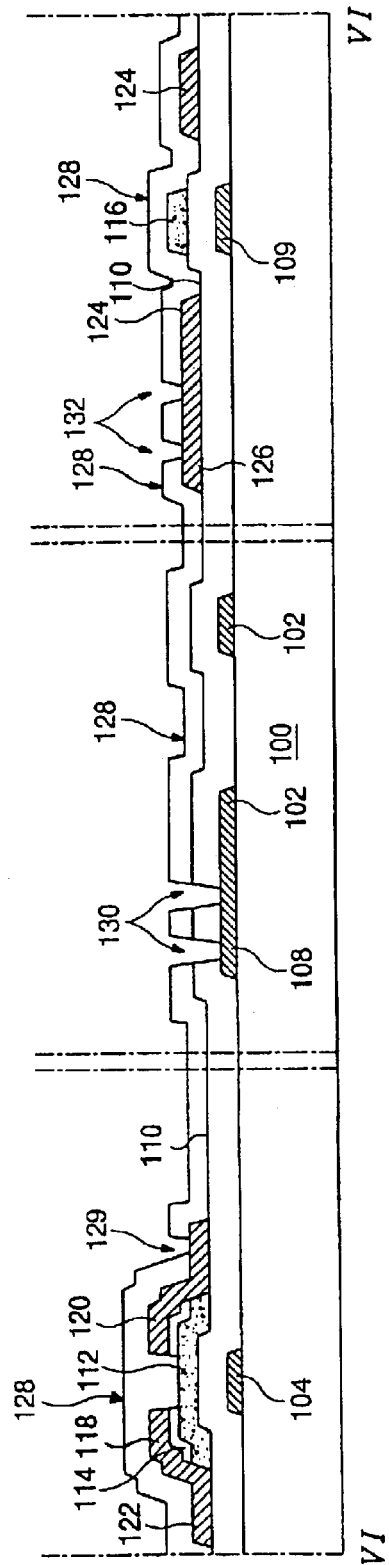

In FIG. 6C, a second insulating layer 128, a passivation layer, is formed on an entire surface of the substrate 100 through depositing one of an inorganic insulating material group including silicon nitride (SiNx) and silicon oxide (SiO$_2$). The second insulating layer 128 is about 2000 in height. Sequentially, a drain contact hole 129 exposing the drain electrode 120, a gate pad contact hole 130 exposing the gate pad 108 and a data pad contact hole 132 exposing the data pad 126 are formed through patterning the second insulating layer 128. A plurality of gate pad contact holes 130 or a plurality of data pad contact holes 132 may be formed to increase a contact area between a gate pad terminal 136 (FIG. 6D) and the gate pad 108 or between a data pad terminal 138 (FIG. 6D) and the data pad 126 in a process described next.

Figure 6D:
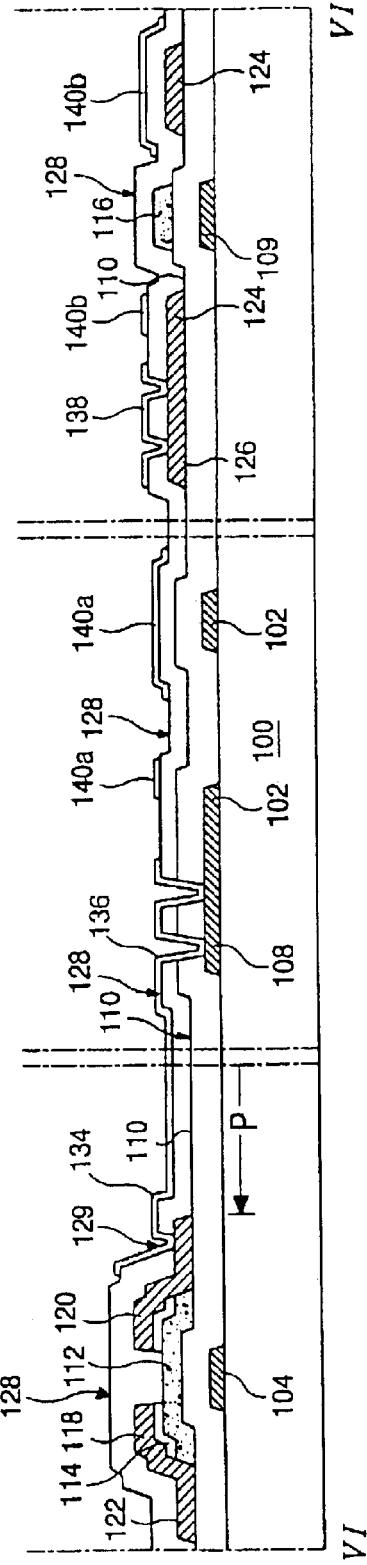

In FIG. 6D, a pixel electrode 134, the gate pad terminal 136 and the data pad terminal 138 are formed on the second insulating layer 128 through depositing and patterning one of a transparent conductive material group including indium-tin-oxide (ITO) and indium-zinc-oxide (IZO). The pixel electrode 134 is disposed at the pixel region "P" and connected to the drain electrode 120 through the drain contact hole 129. The gate pad terminal 136 contacts the gate pad 108 through the gate pad contact hole 130 and the data pad terminal 138 contacts the data pad 126 through the data pad contact hole 132. At the same time, the protection pattern 140a and 140b of the same layer as the pixel electrode 134 is formed over the gate link line 102 and the data link line 124. The protection pattern 140a and 140b, which is about 420 in height, mitigates an external physical impact.

In the first embodiment of the present invention, since the first dummy pattern 109 of about 2700 in height and the second dummy pattern 116 of about 2000 in height are further formed between the adjacent data link lines 124, a portion having the first and second dummy patterns 109 and 116 becomes about 10700 in height and a portion having the data link line 124 becomes about 7920 in height. That is, the portion having the first and second dummy patterns 109 and 116 is about 3000 higher that the portion having the data link line 124. Therefore, a scratch, a hack or a breakage of the data link line 124 by a glass chip, during a cutting process of the second substrate 101, may be prevented.

Figure 7:
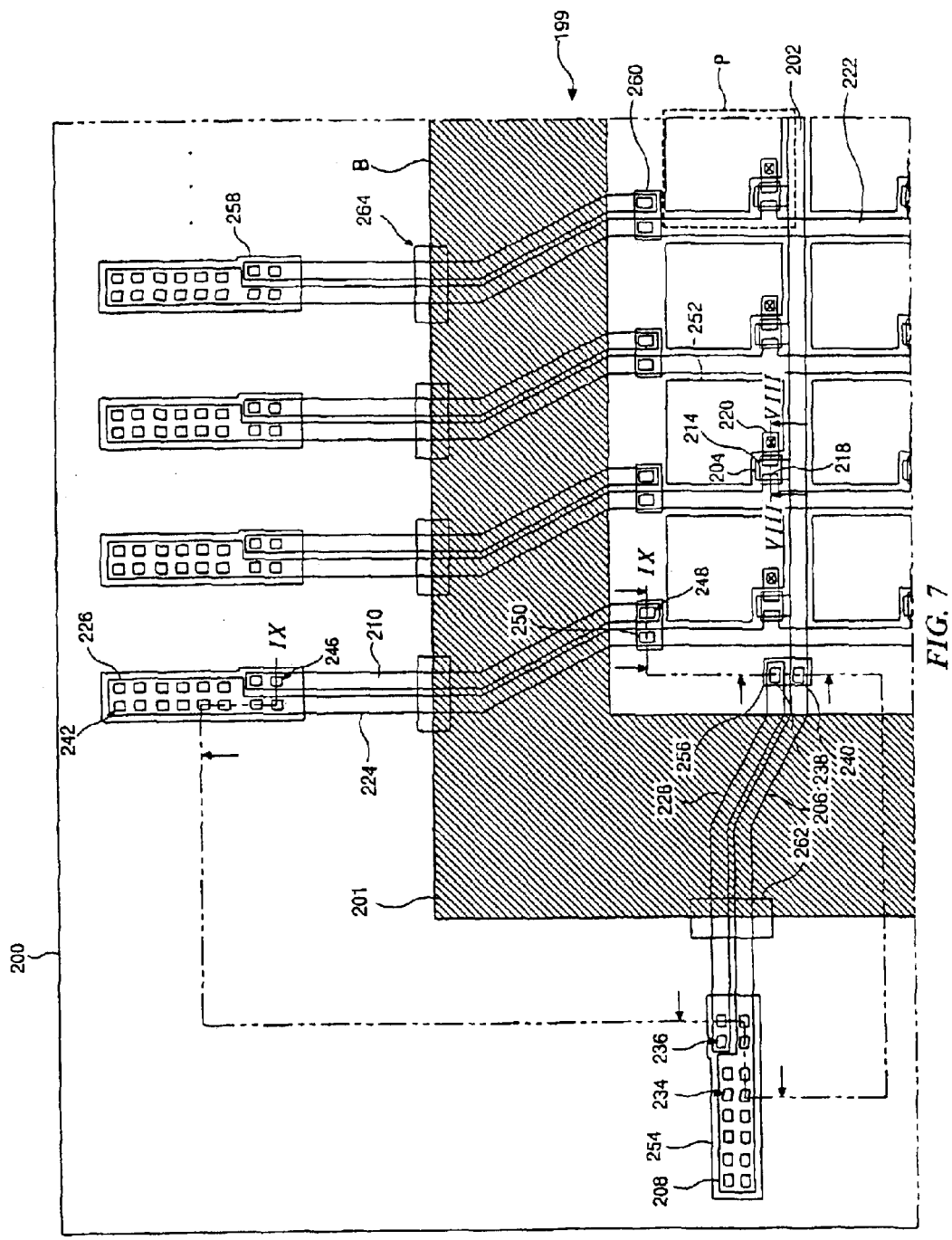
FIG. 7 is a schematic plan view of a liquid crystal display device, according to a second embodiment of the present invention.

FIG. 7 is a schematic plan view of a liquid crystal display device according to a second embodiment of the present invention. In FIG. 7, an LCD device 199 includes first and second substrates 200 and 201, spaced apart from each other. A gate line 202 is formed on the first substrate 200 along a first direction. A gate link line 206 is extended from the gate line 202, and a gate pad 208 is disposed at one end of the gate link line 206. Here, a gate dummy line 228 is parallel to and spaced apart from, the gate link line 206.

A gate pad terminal 254 contacts the gate pad 208 through a gate pad contact hole 234 and one end of the gate dummy line 228 through a first contact hole 236. Further, a gate contact pattern 256 also contacts the other end of the gate link line 206 through a gate link line contact hole 240 and the other end of the gate dummy line 228 through a second contact hole 238. Therefore, an input signal of the gate pad 208 flows in the gate link line 206 and the gate dummy line 228 at the same time.

A data line 222 crosses the gate line 202 to define a pixel region "P." The data line 222 is formed over the first substrate 200 along a second direction. A data link line 224 is extended from the data line 222 and a data pad 226 is disposed at one end of the data link line 224. A data dummy line 210 is parallel to, and spaced apart from, the data link line 224. A data pad terminal 258 contacts the data pad 226 through a data pad contact hole 242 and one end of the data dummy line 210 through a third contact hole 246. Further, a data contact pattern 260 also contacts the other end of the data link line 224 through a data link line contact hole 250 and the other end of the data dummy line 210 through a fourth contact hole 248.

When the gate link line 206 or the data link line 224 is broken near a cutting line "B" during a cutting process of the second substrate 201, the input signal may flow through the gate dummy line 228 or the data dummy line 210 instead of the broken gate link line 206 or the broken data link line 224. Since the gate dummy line 228 and the data dummy line 210 are simultaneously formed with the data line 222 and the gate line 202, an additional process is not necessary. Moreover, protection patterns 262 and 264 of an island shape are formed over the data link line 224 and the gate link line 206.

FIGS. 8A to 9D are schematic cross-sectional views showing a fabricating process of an array substrate for the liquid crystal display device according to the second embodiment of the present invention. FIGS. 8A to 8D are taken along the line VIII—VIII of FIG. 7 and FIGS. 9A to 9D are taken along the line IX—IX of FIG. 7.

Figure 8A:
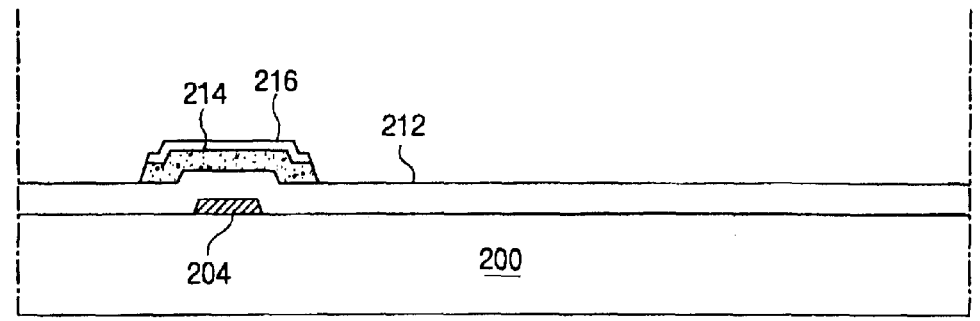
FIGS. 8A to 8D are schematic cross-sectional views showing a fabricating process of an array substrate for the liquid crystal display device of FIG. 7, taken along the line VIII—VIII of FIG. 7.
Figure 9A:
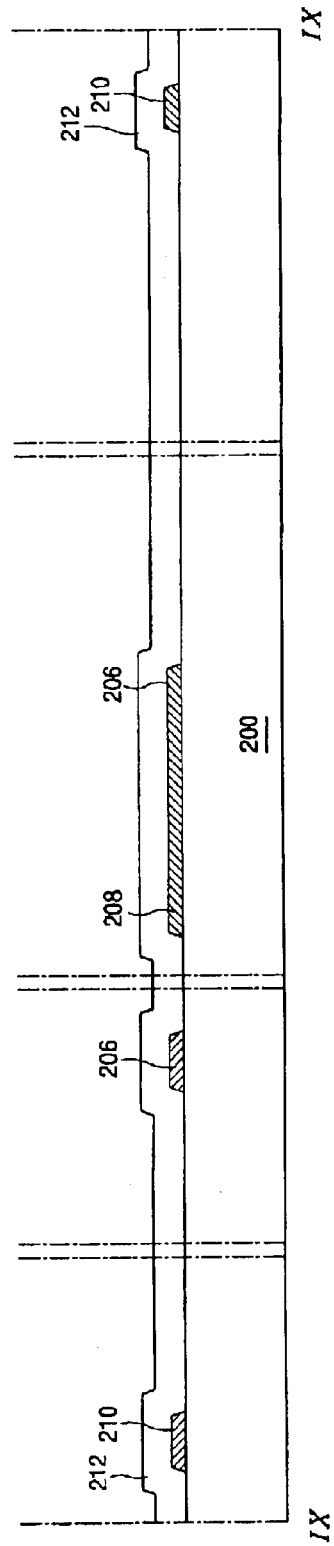
FIGS. 9A to 9D are schematic cross-sectional views showing a fabricating process of the array substrate for the liquid crystal display device of FIG. 7, taken along the line IX—IX of FIG. 7.

In FIGS. 8A and 9A, the gate electrode 204, the gate line 202 (of FIG. 7), the gate link line 206, the gate pad 208 and the data dummy line 210 are formed on the first substrate 200 through depositing and patterning one of a low resistive conductive metal group including aluminum (Al) and aluminum alloy. The gate electrode 204 is connected to the gate line 202 (of FIG. 7) and the gate link line 206 is extended from the gate line 202 (of FIG. 7). The gate pad 208 is disposed at one end of the gate link line 206, and the data dummy line 210 is disposed at a data driving portion. Here, the gate electrode 204, the gate line 202 (of FIG. 7), the gate link line 206, the gate pad 208 and the data dummy line 210 may have chromium (Cr) or molybdenum (Mo) on the aluminum or aluminum alloy.

Next, a first insulating layer 212, a gate insulating layer, is formed on an entire surface of the first substrate 200 through depositing one of an inorganic insulating material group including silicon nitride (SiNx) and silicon oxide (SiO$_2$). Next, an active layer 214 and an ohmic contact layer 216 are formed on the first insulating layer 212 over the gate electrode 204 through sequentially depositing and patterning amorphous silicon including hydrogen (a-Si:H) and impurity-doped amorphous silicon (p$^+$a-Si:H or n$^+$a-Si:H).

Figure 8B:
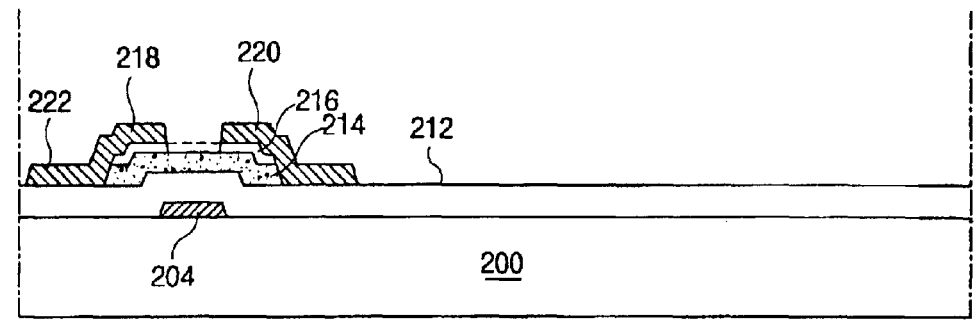
Figure 9B:
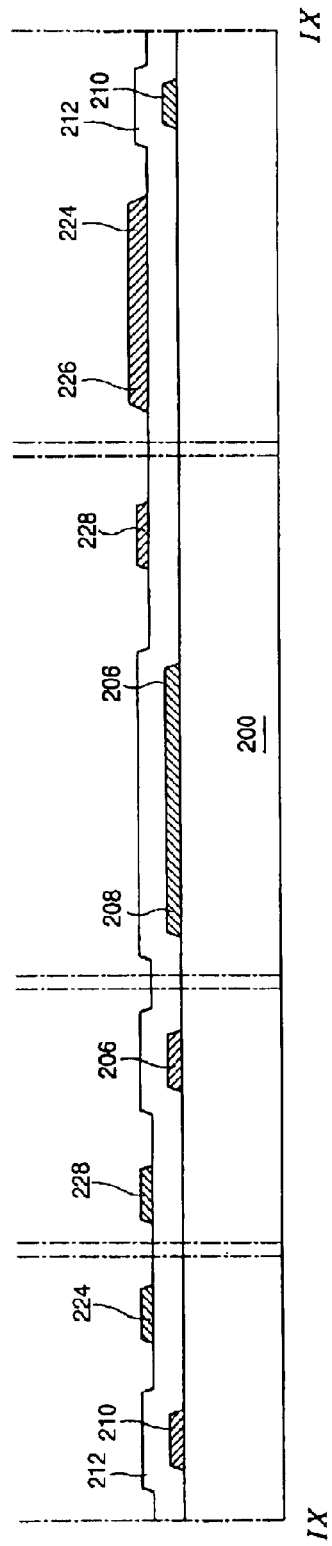

In FIGS. 8B and 9B, the data line 222, and source and drain electrodes 218 and 220 are formed on the first insulating layer 212 through depositing and patterning one of a conductive metal group including chromium (Cr), tungsten (W), molybdenum (Mo) and titanium (Ti). The source and drain electrodes 218 and 220 contact the ohmic contact layer 216. The data line 222 is connected to the source electrode 218. A data link line 224 is extended from the data line 222 and a data pad 226 is disposed at one end of the data link line 224. Simultaneously, a gate dummy line 228 is formed between the adjacent gate link lines 206.

The source and drain electrodes 218 and 220 are spaced apart from each other, and the active layer 214 between the source and drain electrodes 218 and 220 is exposed through etching the ohmic contact layer 216 between the source and drain electrodes 218 and 220. The active layer 214 between the source and drain electrodes 218 and 220 functions as a channel where carriers are transmitted. The data link line 224 is parallel to and space apart from the data dummy line 210. The data dummy line 210 or the gate dummy line 228 is used as a repair line when the gate link line 206 or the data link line 224 is broken.

Figure 8C:
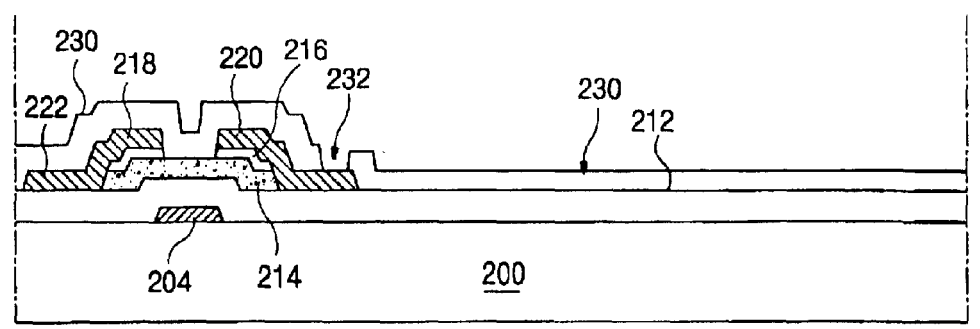
Figure 9C:
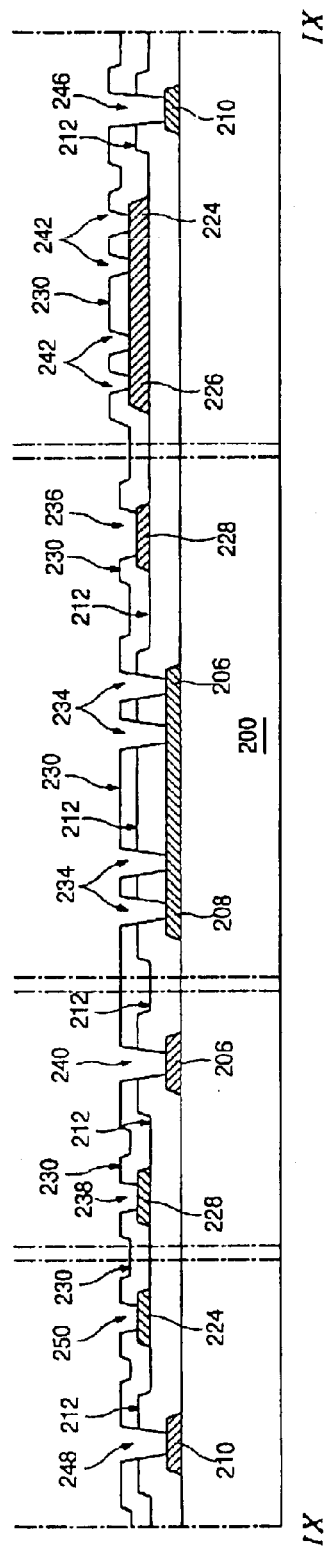

In FIGS. 8C and 9C, a second insulating layer 230, a passivation layer, is formed on an entire surface of the first substrate 200 through depositing one of an inorganic insulating material group including silicon nitride (SiNx) and silicon oxide (SiO$_2$). Sequentially, a drain contact hole 232, exposing the drain electrode 220, a gate pad contact hole 234, exposing the gate pad 208, a first contact hole 236 exposing one end of the gate dummy line 228, a second contact hole 238 exposing the other end of the gate dummy line 228 and a gate link line contact hole 240 exposing an end, opposite the gate pad end, of the gate link line 206, are formed through patterning the first insulating layer 212 and second insulating layer 230. At the same time, a data pad contact hole 242 exposing the data pad 226, a third contact hole 246 exposing one end of the data dummy line 210, a fourth contact hole 248 exposing the other end of the data dummy line 210 and a data link line contact hole 250 exposing an end, opposite the data pad end, of the data link line 224, are formed.

Figure 8D:
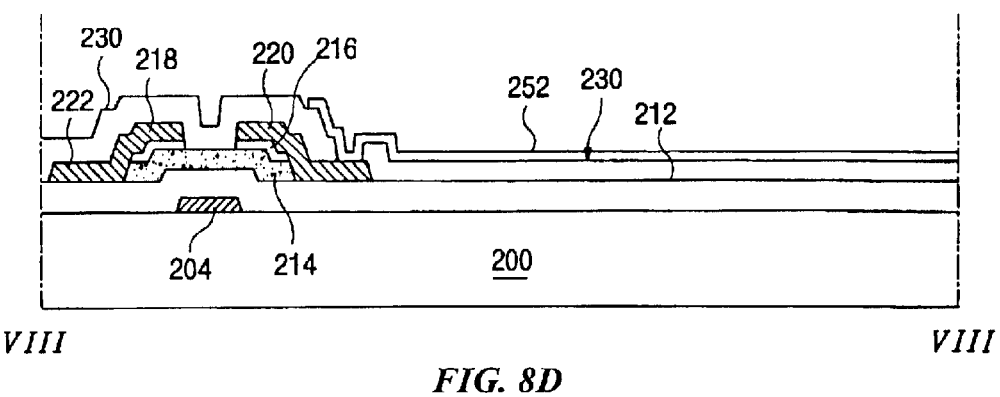
Figure 9D:
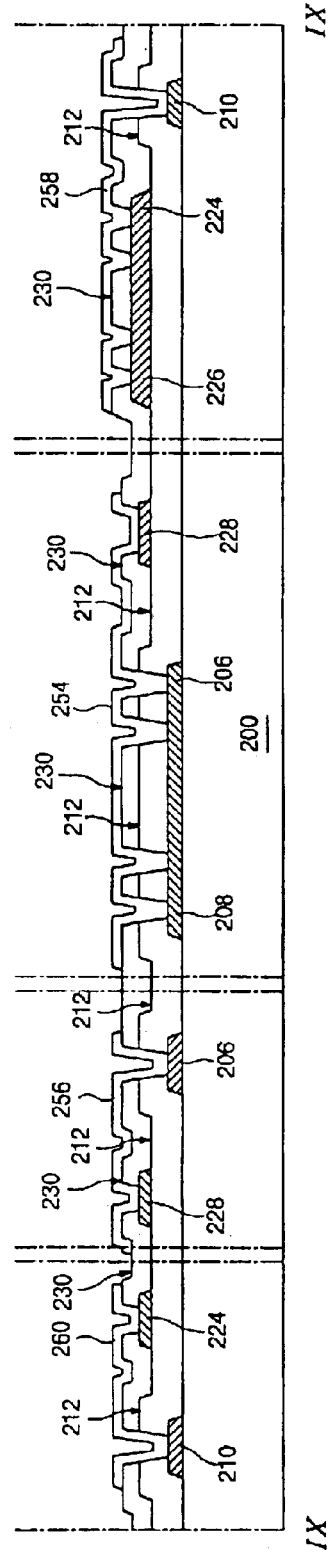

In FIGS. 8D and 9D, a pixel electrode 252, a gate pad terminal 254, a gate contact pattern 256, a data pad terminal 258 and a data contact pattern 260 are formed on the second insulating layer 230 through depositing and patterning one of a transparent conductive material group including indium-tin-oxide (ITO) and indium-zinc-oxide (IZO). The pixel electrode 252 is disposed at the pixel region "P" and connected to the drain electrode 220 through the drain contact hole 232. The gate pad terminal 254 contacts the gate pad 208 through the gate pad contact hole 234 and one end of the gate dummy line 228 through the first contact hole 236. The gate contact pattern 256 contacts the other end, the opposite end to the gate pad 208, of the gate link line 206 through the gate link line contact hole 240 and the other end of the gate dummy line 228 through the second contact hole 238.

The data pad terminal 258 contacts the data pad 226 through the data pad contact hole 242 and one end of the data dummy line 210 through the third contact hole 246. The data contact pattern 260 contacts the other end, the opposite end to the data pad 226, of the data link line 224 through the data link line contact hole 250 and the other end of the data dummy line 210 through the fourth contact hole 248.

The protection patterns 262 and 264 (of FIG. 7) are formed over the gate link line 206, the gate dummy line 228, the data link line 224 and the data dummy line 210 along a cutting line (not shown) of the second substrate 201.

In the second embodiment, the gate link line 206 and the gate dummy line 228 are electrically connected to each other through the gate pad terminal 254 and the gate contact pattern 256. Moreover, the data link line 224 and the data dummy line 210 are also electrically connected to each other through the data pad terminal 258 and the data contact pattern 260. Therefore, an external signal can flow through the gate dummy line 228 or data dummy line 210 even when the gate link line 206 or the data link line 224 is broken during a cutting process of the second substrate 201.

Since the first and second insulating layers 212 and 230 are formed over the gate link line 206, a breakage of the gate link line 206 seldom occurs during the cutting process. Accordingly, the gate dummy line 228 may be omitted.

Consequently, since a dummy pattern or a dummy line is formed over the first substrate 200 at a portion corresponding to a cutting line of the second substrate 201, the likelihood of damage of a link line during a cutting process is reduced. Moreover, a dummy line is substituted for a link line even when the link line is broken. Therefore, reliability is improved.

It will be apparent to those skilled in the art that various modifications and variations can be made in the fabrication and application of the present invention without departing from the spirit or scope of the invention. Thus, it is intended that the present invention cover the modifications and variations thereof provided they come within the scope of the appended claims and their equivalents.

What is claimed is:

1. An array substrate for a liquid crystal display device, comprising:
    a first substrate;
    a plurality of gate lines and gate link lines formed on said first substrate, said gate link lines being extensions of said gate lines;
    a plurality of data lines and data link lines formed on said first substrate, said data link lines being extension of said data lines, said data lines crossing either above or below said gate lines to define a plurality of pixel regions;
    a plurality of thin film transistors connected to respective ones of said gate lines and said data lines;
    a first plurality of dummy patterns formed on said substrate, each dummy pattern being located between adjacent data link lines;
    a second plurality of dummy patterns located above the first plurality of dummy patterns and separated therefrom, the total height of both dummy patterns above said substrate being a predetermined distance above the height of the plurality of gate lines and data lines; and
    a pixel electrode provided at each pixel region.

2. The substrate according to claim 1, further comprising:
    a plurality of gate pads, each gate pad being formed at an end of a gate link line;
    a plurality of gate pad terminals, each gate pad terminal contacting one of the gate pads;
    a plurality of data pads, each data pad being formed at an end of a data link line; and
    a plurality of data pad terminals, each data pad terminal contacting one of the data pads.

3. The substrate according to claim 1, further comprising:
    a second substrate formed over said first substrate; and
    a cutting line formed along said second substrate, wherein said plurality of dummy patterns underlie said cutting line of said second substrate.

4. An array substrate for a liquid crystal display device, comprising:

a first substrate;

a plurality of gate lines and gate link lines formed on said first substrate, said gate link lines being extensions of said gate lines;

a plurality of data lines and data link lines formed on said first substrate, said data link lines being extension of said data lines, said data lines crossing either above or below said gate lines to define a plurality of pixel regions;

a plurality of thin film transistors having a gate electrode, an active layer, and source and drain electrodes connected to respective ones of said gate lines and said data lines;

a plurality of dummy patterns formed on said substrate, each dummy pattern being located between adjacent data link lines and having first and second dummy pattern parts;

a pixel electrode provided at each pixel region; and wherein said first dummy pattern part is formed of a same material as, and formed on a same layer as, said gate line.

5. The substrate according to claim 4, wherein said second dummy pattern part is formed of a same material as, and formed on a same layer as, said active layer.

6. The substrate according to claim 4, wherein each first dummy pattern part has a thickness of approximately 2700 Å.

7. The substrate according to claim 6, wherein each data line and data link line has a thickness of approximately 1500 Å.

8. The substrate according to claim 6, wherein each second dummy pattern part has a thickness of approximately 2000 Å.

9. An array substrate for a liquid crystal display device, comprising:

a first substrate;

a plurality of gate lines and gate link lines formed on said first substrate, said gate link lines being extensions of said gate lines;

a plurality of data lines and data link lines formed on said first substrate, said data link lines being extension of said data lines, said data lines crossing either above or below said gate lines to define a plurality of pixel regions;

a plurality of thin film transistors connected to respective ones of said gate lines and said data lines;

a plurality of dummy patterns formed on said substrate, each dummy pattern being located between adjacent data link lines;

a pixel electrode provided at each pixel region; and a first protection pattern formed over said gate link lines.

10. The substrate according to claim 9, wherein said first protection pattern is a series of individual first protection patterns, each individual first protection pattern being formed over one of said gate link lines.

11. The substrate according to claim 9, further comprising:

a second protection pattern formed over said data link lines.

12. The substrate according to claim 11, wherein said second protection is a series of individual second protection patterns, each individual second protection pattern being formed over one of said data link lines.

13. The substrate according to claim 12, wherein each individual second protection pattern is also formed over one of said data dummy patterns.

14. The substrate according to claim 11, wherein said first and second protection patterns are formed of a same material as, and formed on a same layer as, said pixel electrode.

15. The substrate according to claim 14, wherein said pixel electrode and said protection pattern are formed of a transparent conductive material including at least one of indium-tin-oxide (ITO) and indium-zinc-oxide (IZO).

16. An array substrate for a liquid crystal display device, comprising:

a first substrate;

a plurality of gate lines and gate link lines formed on said first substrate, said gate link lines being extensions of said gate lines;

a plurality of data lines and data link lines formed on said first substrate, said data link lines being extension of said data lines, said data lines crossing either above or below said gate lines to define a plurality of pixel regions;

a plurality of thin film transistors having a gate electrode, an active layer, and source and drain electrodes connected to respective ones of said gate lines and said data lines;

a plurality of dummy patterns formed on said substrate, each dummy pattern being located between adjacent data link lines;

a pixel electrode provided at each pixel region;

a plurality of gate pads, each gate pad being formed at an end of a gate link line;

a plurality of gate pad terminals, each gate pad terminal contacting one of the gate pads;

a plurality of data pads, each data pad being formed at an end of a data link line; and a plurality of data pad terminals, each data pad terminal contacting one of the data pads, wherein each dummy pattern includes a data dummy line connecting a respective data pad to a respective data line, thus providing an electrical connection between the respective data pad and the respective data line, duplicative of a respective data link line.

* * * * *